UNITED STATES PATENT OFFICE.

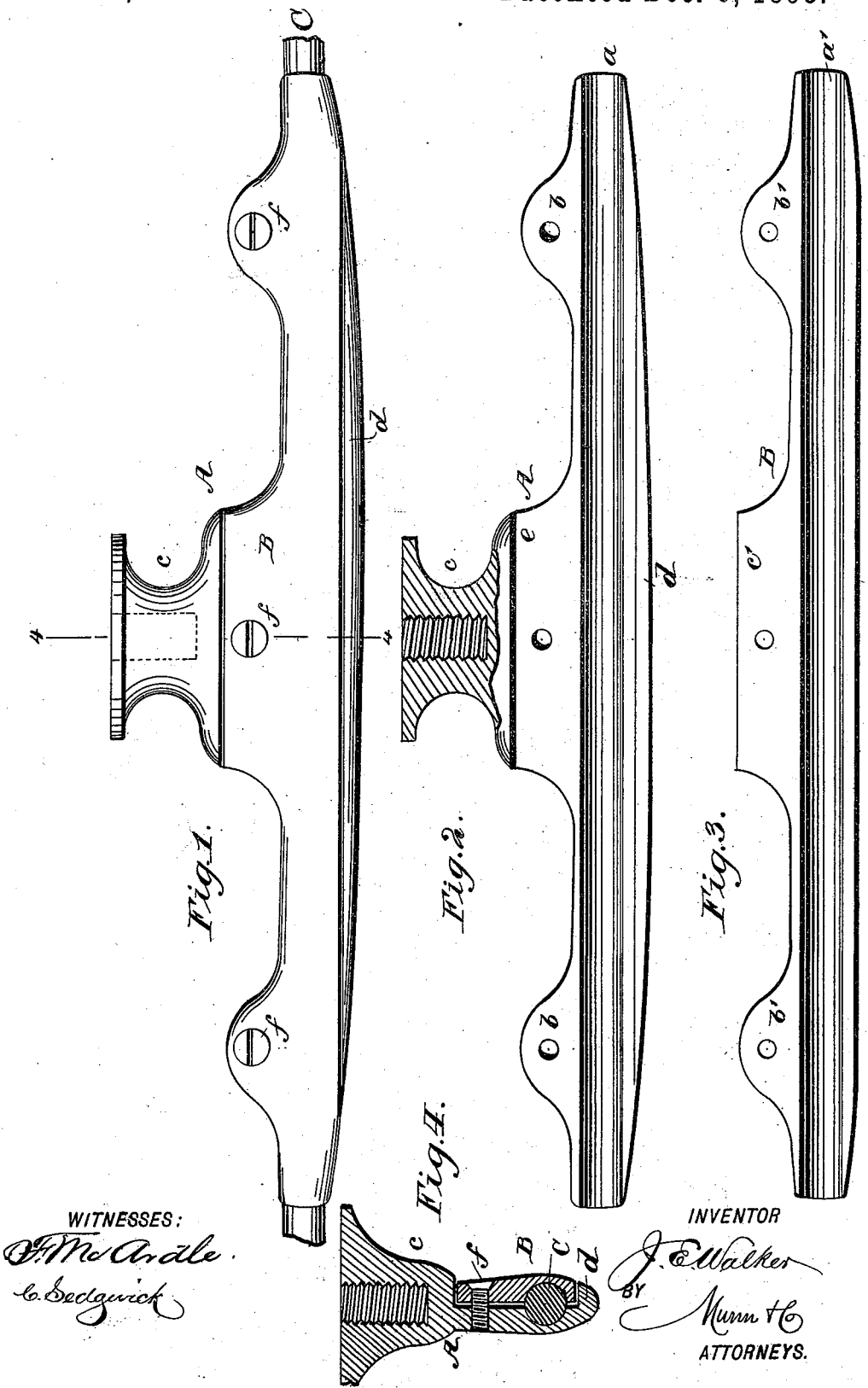

JAMES E. WALKER, OF DENVER, COLORADO.

SUPPORT FOR TROLLEY-WIRES.

SPECIFICATION forming part of Letters Patent No. 510,217, dated December 5, 1893.

Application filed May 3, 1893. Serial No. 472,896. (No model.)

*To all whom it may concern:*

Be it known that I, JAMES EDGAR WALKER, of Denver, in the county of Arapahoe and State of Colorado, have invented a new and Improved Support for Trolley-Wires, of which the following is a specification, reference being had to the annexed drawings, forming a part thereof, in which—

Figure 1 is a side elevation of my improved support for trolley wires. Fig. 2 is a side elevation, partly in section, with the clamping piece removed. Fig. 3 is a side view of the clamping piece; and Fig. 4 is a vertical transverse section taken on line 4—4 in Fig. 1.

Similar letters of reference indicate corresponding parts in all the views.

The object of my invention is to provide a simple and effective support for trolley wires, which can be easily and quickly applied without the use of solder, thereby prolonging the life of the trolley wire.

My invention consists in a trolley wire support formed of a longitudinally grooved casting furnished with a screw-threaded socket for attachment to the insulator, and a removable clamping piece attached to the main piece by means of screws, all as will be hereinafter more fully described.

The body A, of the trolley wire support is provided with a half-round longitudinal groove $a$, with ears $b$, and a central socket $c$. The lower edge of the body A is provided with a lip $d$, between which and the shell $e$ adjoining the socket $c$, is fitted a clamping piece B, which is provided with a half-round longitudinal groove $a'$, the ears $b'$, $b'$, and the central extension $c'$ which adjoins the shoulder $e$ when the clamping piece B is in its place on the body A. The ears $b'$ and the extension $c'$ are provided with apertures in which are inserted screws $f$, which extend through the clamping piece into threaded holes in the ears $b$ and in the central part of the body A. The lower edge of the body A is made downwardly convex to increase the strength of the support, and to furnish an easy curve for the trolley wheel to follow in passing over the support A.

The trolley wire C fits the cylindrical hole formed by the semi-circular grooves $a$, $a'$ in the body A and in the clamping piece B, and extends in a straight line through the trolley wire support. The ends of the support are tapered and reduced in thickness to avoid any injury to the trolley wheel as it strikes the support. The screw threaded socket $c$ fits any of the ordinary insulators used in supporting trolley wires.

Besides avoiding injury to the trolley wire by means of solder, my improved support has the advantages of being quickly applied to and removed from the wire, and of furnishing a support which will be smooth and noiseless.

Having thus described my invention, I claim as new and desire to secure by Letters Patent—

1. A support formed of the body A, having a longitudinal groove $a$, a screw-threaded socket $c$ and lip $d$, and the clamping piece B, having the longitudinal groove $a'$, and screws $f$ passing through the clamping piece and into the body of the support, substantially as specified.

2. A clamping trolley-wire support, having a longitudinal cylindrical hole for receiving the trolley wire, and having its lower edge convex in the direction of its length, substantially as specified.

JAMES E. WALKER.

Witnesses:
CHARLES N. PERKINS,
OSCAR J. DRUMM.